United States Patent [19]
Weigl

[11] Patent Number: 5,913,452
[45] Date of Patent: Jun. 22, 1999

[54] CONTAINER FOR FOOD OR DRINK ATTACHABLE TO AN AIR CONDITIONER LOUVER

[76] Inventor: Adolph Weigl, 688 Wiggins Lake Dr., Naples, Fla. 34102

[21] Appl. No.: 09/050,170

[22] Filed: Mar. 30, 1998

[51] Int. Cl.$^6$ ..................................................... A47G 29/00
[52] U.S. Cl. ........................ 220/737; 220/480; 248/311.2
[58] Field of Search .................................. 220/737, 739, 220/743, 751, 480, 481, 482; 248/311.2

[56] References Cited

U.S. PATENT DOCUMENTS

| | | | |
|---|---|---|---|
| 841,462 | 1/1907 | Smith | 220/480 |
| 3,027,036 | 3/1962 | Budreck | 220/480 X |
| 4,629,153 | 12/1986 | Marcum | 220/482 X |
| 4,852,843 | 8/1989 | Chandler | 220/737 X |
| 5,381,922 | 1/1995 | Gladman et al. | 220/481 |
| 5,597,087 | 1/1997 | Vinarsky | 220/482 |

*Primary Examiner*—Steven Pollard

[57] ABSTRACT

A container for food, drink and the like attachable to the vent opening of an air conditioner or fan unit by at least one hook-shaped element attached to a louver of the vent opening of an air conditioning or fan unit in order to cool or heat the contents of the container.

6 Claims, 1 Drawing Sheet

CONTAINER FOR FOOD OR DRINK ATTACHABLE TO AN AIR CONDITIONER LOUVER

BACKGROUND OF THE INVENTION

This invention relates to a container which is readily attachable to an air conditioning or fan unit in order to cool or warm the contents of the container.

While traveling in a private passenger car or similar vehicle, there often exists a need to keep drinks, food and the like at certain temperatures for short or longer periods of time. In a moving vehicle, cold canned beverages reach the inside temperature of the vehicle in a very short period of time. For this reason it has been suggested to make use of the air produced by the air conditioning or fan unit in order to cool a container of food or drink. However, the mechanisms suggested are complicated, voluminous and therefore very costly. Moreover, the mechanisms cannot be universally installed on a variety of vehicles. The mechanisms are too complicated for the layman and must therefore be professionally installed at considerable cost.

SUMMARY OF THE INVENTION

The present invention attaches a container for food and/or drink to a louver of an air conditioning or fan unit in a simple and cost efficient manner.

First off, the container includes an opening for air intake from an air conditioning or fan vent opening. With the air intake opening in the container facing a channel leading to an air conditioning or fan vent opening, the container is attachable to one of the louvers of the vent opening by one or more hook-shaped elements.

So that the container may be attached to any desired air conditioning vent opening, the invention includes adapters which permit the container's air intake opening to face the air conditioning vent opening despite the particular design of the vent opening and be securely held in place by the hook-shaped elements attached to one of the louvers of the vent opening.

DESCRIPTION OF THE PREFERRED EMBODIMENTS

Container 1 has a preferred interior diameter of about 75 mm and a height of about 11 cm, equivalent to the proportions of a beverage can such as a can of Coca Cola. Container 1 is preferably made of plastic foam material similar to that found in the dashboard of most modern vehicles to avoid the danger of injury in case of an accident.

On its lower portion container 1 has opening 12 in the container wall allowing air from an air conditioning or fan vent opening to stream toward the contents of container 1. Opening 12 is bounded by plastic holder 2 shown in FIG. 1 manufactured preferably by the spray-coated method. Plastic holder 2 includes a solid shaped holder 3 shown in FIG. 2 onto which container 1 is mounted and may be easily removed for cleaning.

Figure 1:
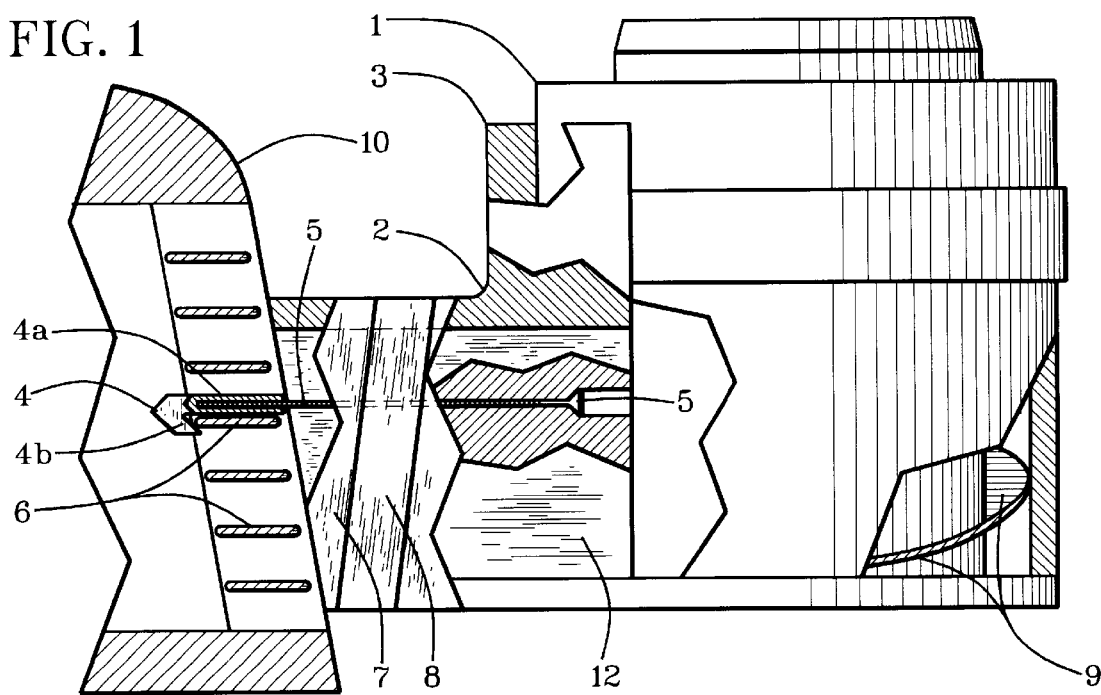
FIG. 1 is a side view partially in cross-section showing a container with means for attachment to a louver of an air conditioning vent opening.
Figure 2:
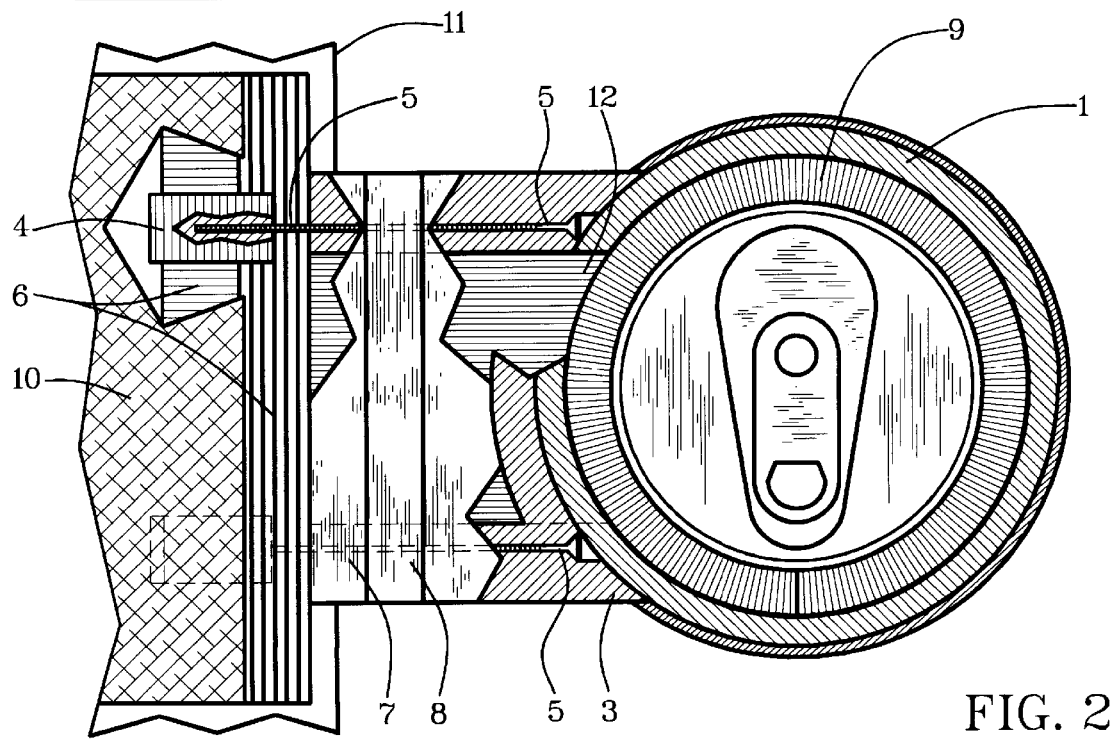
FIG. 2 is a top plan view partially in cross-section showing further details of the mechanism for attaching a container to the air conditioning vent opening.

FIGS. 1 and 2 illustrate the preferred way of attaching container 1 to an air conditioning or fan vent opening. All vent openings have a number of vertically or horizontally spaced apart louvers 6 as best shown in FIG. 1. Onto one of louvers 6, container 1 is attached. Preferably two spaced apart hook-shaped members 4 each connected to a threaded screw 5 are placed over a louver 6 and by turning the threaded screws 5 the container will be securely mounted on the air conditioning or fan vent opening. While container 1 is preferably attached by use of two hook-shaped members, it is feasible to use a single hook-shaped member which will provide ample holding stability.

So that the container may be attached to any desired air conditioning vent opening, adapters 7 and 8 are provided. Should, for example, the dashboard 10 be somewhat angular or bothersome projections 11 be present, adapters 7 and 8 can be mounted as shown in FIG. 2. By use of the adapters, a slanting position of container 1 directly facing the air conditioning vent can be achieved. Adapters 7 and 8 can be formed and provided on an "as needed" basis. If no obstructions exist, the adapters can be dispensed with. When the container is attached as previously explained—with or without the use of adapters—container 1 faces directly the vent opening of the air conditioning unit so that the air conditioning or heating unit's air can stream directly into the container.

Within the container there can be a coil 9 present as shown in FIG. 2. Coil 9 serves to direct air entering the container in an upward direction all around the container. This assures a certain elasticity within the container and thus a changeable inner diameter of container 1 so that beverage cans or bottles of various diameters are held fast and cannot be shaken about. In addition, other materials may be stored and held at certain temperatures in the container, for example, medications or camera film.

Container 1 can be made in various shapes and sizes to allow it to contain a variety of products in addition to drinks and food. Container 1 can also be used to heat the contents of the container. Depending upon the temperature set on the vehicle's heating unit, the container can be used to heat a baby bottle of milk or baby foods to the desired temperature for very small children.

While there has been shown and described preferred embodiments of the invention, the spirit and scope of the invention is defined only by the following claims.

I claim:

1. A container for food or drink which has an opening in its lower portion and a coil for directing air entering the container in an upward direction all around the container and is attachable to the vent opening of an air conditioning or fan unit, the vent opening having a plurality of spaced apart louvers, comprising at least one hook-shaped element attached to one of the louvers of the vent opening and means for securing the container to the hook-shaped element in which the the opening in the container's lower portion faces the vent opening so that air from the air conditioning or fan vent opening streams toward the contents of the container and is directed upward all around the container.

2. A container as set forth in claim 1 wherein the number of hook-shaped elements used to secure the container is two.

3. A container as set forth in claim 1 wherein the container is made of plastic material.

4. A container as set forth in claim 1 wherein the container has an opening in the lower portion of the container wall to allow air from the air conditioning or fan vent opening to stream toward the contents of the container.

5. A container as set forth in claim 1 which includes one or more adapters designed to place the opening in the wall of the container in close contact with and directly facing the vent opening of the air conditioning or fan unit.

6. A container as set forth in claim 1 wherein the means for securing the container to the hook-shaped element is a threaded screw attached to the hook-shaped element.

* * * * *